(12) United States Patent
Rüter et al.

(10) Patent No.: US 10,115,941 B2
(45) Date of Patent: Oct. 30, 2018

(54) BATTERY HOUSING AND METHOD FOR INSTALLING A BATTERY

(71) Applicant: Lisa Dräxlmaier GmbH, Vilsbiburg (DE)

(72) Inventors: Karsten Rüter, Landshut (DE); Guido Hofer, Weng (DE); Stefan Deser, Landshut (DE); Martin Huber, Neufahrn/Nb. (DE); Matthias Stein, Landshut (DE); Michael Koller, Neufraunhofen (DE); Andreas Kraft, Günzkofen (DE)

(73) Assignee: Lisa Dräxlmaier GmbH, Vilsbiburg (DE)

( * ) Notice: Subject to any disclaimer, the term of this patent is extended or adjusted under 35 U.S.C. 154(b) by 940 days.

(21) Appl. No.: 14/260,770

(22) Filed: Apr. 24, 2014

(65) Prior Publication Data

US 2014/0322582 A1 Oct. 30, 2014

(30) Foreign Application Priority Data

Apr. 25, 2013 (DE) .................. 10 2013 207 534

(51) Int. Cl.
*H01M 10/6556* (2014.01)
*H01M 2/10* (2006.01)

(52) U.S. Cl.
CPC ...... *H01M 2/1072* (2013.01); *H01M 10/6556* (2015.04); *H01M 2220/20* (2013.01); *Y10T 29/49108* (2015.01)

(58) Field of Classification Search
CPC ......... H01M 10/6552; H01M 10/6556; H01M 2/1072; H01M 10/1016; H01M 10/6567; H01M 10/6568; H01M 10/6569
See application file for complete search history.

(56) References Cited

U.S. PATENT DOCUMENTS

| | | | | |
|---|---|---|---|---|
| 5,432,026 A | * | 7/1995 | Sahm ................. | B60H 1/00278 429/120 |
| 2009/0274952 A1 | * | 11/2009 | Wood ................. | B60L 11/1874 429/99 |
| 2010/0147488 A1 | * | 6/2010 | Pierre ................. | H01M 2/1077 165/47 |
| 2011/0104548 A1 | * | 5/2011 | Saito ................... | H01M 2/1072 429/120 |
| 2011/0151314 A1 | * | 6/2011 | Ogawa ............... | H01M 2/1077 429/158 |

(Continued)

FOREIGN PATENT DOCUMENTS

| | | |
|---|---|---|
| DE | 10 2008 034 873 A1 | 1/2010 |
| DE | 10 2008 059 967 A1 | 6/2010 |
| WO | WO 2011/141127 A1 | 11/2011 |

*Primary Examiner* — Maria Laios
(74) *Attorney, Agent, or Firm* — Finnegan, Henderson, Farabow, Garrett & Dunner LLP

(57) ABSTRACT

A battery housing and a method for installing a battery are disclosed. In one embodiment, a battery housing for receiving a battery includes four plate-shaped side panels. Two of the side panel are opposite to each other, and each of the two opposite side panels have at least one elongated recess. The battery housing includes two cover plates. The four plate-shaped side panels and the two cover plates are connected to each other to form a box-shaped housing. The side panels are configured to connect together to hold the battery without the cover plates.

18 Claims, 14 Drawing Sheets

(56) References Cited

U.S. PATENT DOCUMENTS

| | | | |
|---|---|---|---|
| 2012/0156543 A1* | 6/2012 | Cicero | H01M 2/024 429/120 |
| 2012/0177970 A1* | 7/2012 | Marchio | H01M 2/0237 429/120 |
| 2012/0315529 A1* | 12/2012 | Jin | H01M 10/5004 429/120 |
| 2014/0023894 A1* | 1/2014 | Jansen | H01M 2/0245 429/82 |

* cited by examiner

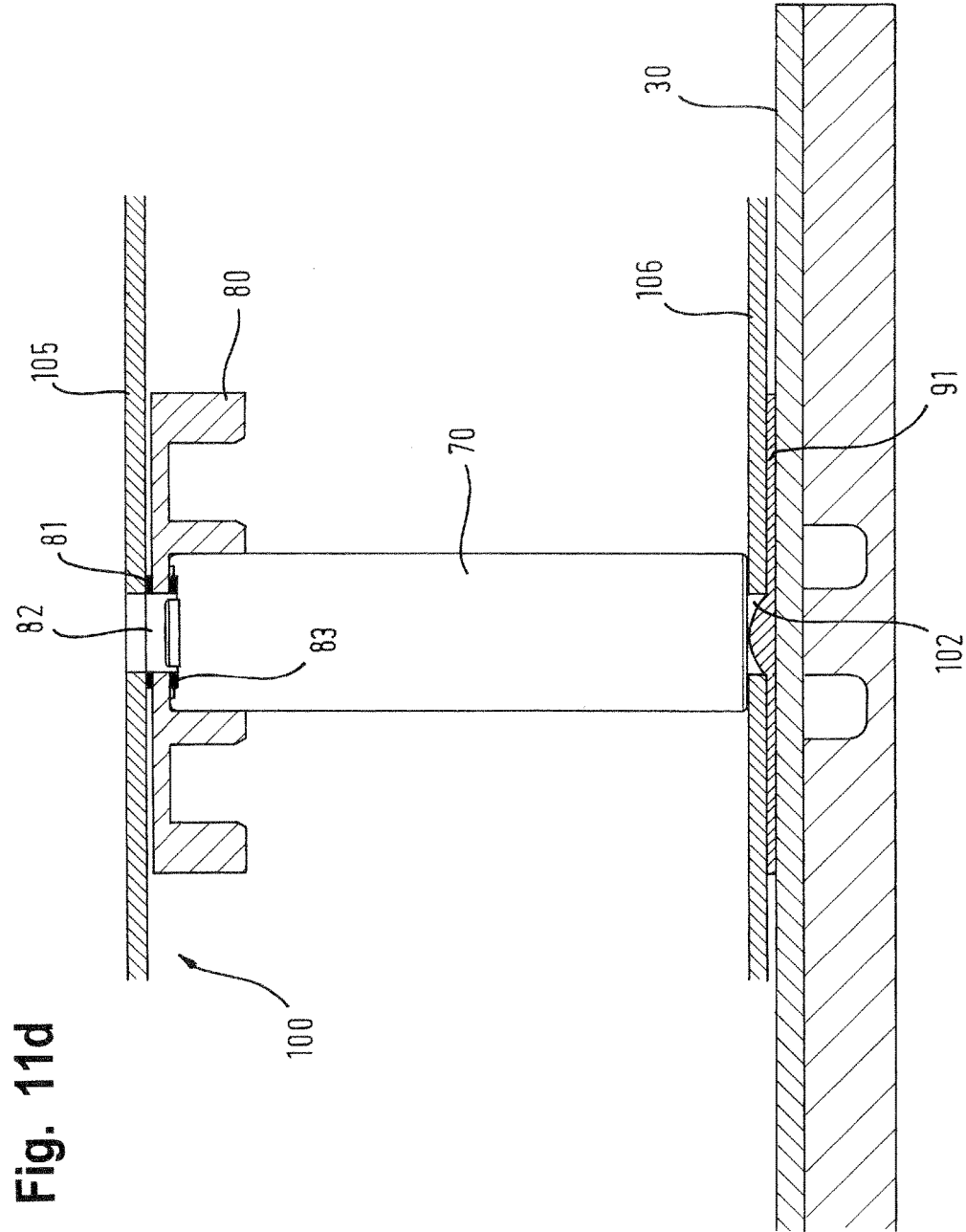

BATTERY HOUSING AND METHOD FOR INSTALLING A BATTERY

CROSS-REFERENCE TO RELATED APPLICATIONS

This application is based upon and claims the benefit of prior German Application No. 10 2013 207 534.0, filed on Apr. 25, 2013, the entire contents of which are incorporated herein by reference.

FIELD OF TECHNOLOGY

The disclosure relates to a battery housing for receiving a battery and, more particularly, to a method for installing a battery.

BACKGROUND

High-voltage batteries for motor vehicle applications, especially in motor vehicles with a hybrid or pure electric power system, are becoming more important. Such batteries typically have a plurality of battery cells, e.g., lithium-ion cells, which need to be cooled in order to dissipate generated heat.

DE 10 2008 059 967 A1 describes a heat-conducting plate arranged in a battery housing for controlling the temperature of the battery, whereby several electrically parallel and/or serially interconnected individual cells are connected with the heat-conduction plate in a heat-conductive manner. Here, the heat-conducting plate is made of a base plate provided with a circular molded edge, into which a cooling coil is inserted and sealed.

DE 10 2008 034 873 A1 also describes a battery having several single cells interconnected in series and/or in parallel and with a cooling element for cooling the individual cells. The cooling element is designed as a heat sink provided with notches into each of which, a single cell is at least partially arranged in longitudinal extension.

The structure described in the above-mentioned references requires that both terminals of the single cells be guided on one side, i.e., through the upper cell cover.

This complicates the structure of the cells. In addition, each layer of juxtaposed individual cells requires a separate heat sink. Furthermore, accurate determination of physical features of the battery cells during battery operation, such as the temperature in the battery cells, is difficult in the above-described structure.

Moreover, further development with regard to safe and low-vibration fixation of the individual battery cells is desirable, especially in automotive applications, at least because the fixation determines the life and durability of the battery.

In the production of high-voltage batteries, the number of components that need to be combined in a predefined sequence is not insignificant, while safety aspects, such as "live-line working" or "working under high voltage" are allowed. Improving the reliability of installation therefore represents a further challenge in the design of batteries.

SUMMARY

One object of the disclosure is to solve at least one of the above-mentioned problems. In particular, one object of the disclosure is to provide a battery housing and a method for simplifying the installation and maintenance of a battery.

This object is achieved with a battery housing and a method for installing a battery as disclosed herein.

A battery housing consistent with embodiments of the disclosure includes six housing components, i.e., four plate-shaped side panels and two cover plates. All six housing components are combinable or combined with one another to form a box-shaped housing. At least two opposite side panels each have an elongated recess, into which a functional battery plate, e.g., a cooling plate, is insertable or has been inserted. In some embodiments, each side panel has a notch, into which the functional plate is insertable or has been inserted. In this manner, the functional battery plate contributes to the stabilization of the battery housing, even when the battery housing is not fully closed. Moreover, the side panels may be interconnected optionally with the aid of the functional plate, such that they hold the whole battery without installed cover plates. In this sense, the battery housing consistent with embodiments of the disclosure is self-supporting.

The battery housing consistent with embodiments of the disclosure allows for installation and/or maintenance work on the battery, which is accessible from the top and/or bottom. Removing the whole system from its installation space is therefore not necessarily required (depending on the installation location or amount of maintenance). In particular, wiring of the battery, in its condition when installed in the battery housing, is possible, whereby safety is substantially increased, especially in the application of a high-voltage vehicle battery. The advantages achieved by the disclosure, as explained above, may be realized by a simple structure of the battery housing, which may be desirable in terms of productivity.

In some embodiments, the four side panels are interconnected, whereby a battery cooling plate is inserted into the recesses as a functional plate. In such embodiments, the cooling plate of the battery is used to dissipate the heat from the battery, as well as serving as a stabilizing "housing" component, whereby a synergetic effect is obtained in this regard.

Two independent cooling circuits may be provided in the cooling plate, which work according to the countercurrent principle, such that a more homogeneous temperature distribution in the battery is obtained. The heat dissipation through the cooling plate may occur at the cathode side of the battery.

In some embodiments, two cooling tubes are fitted into the cooling plate extending substantially parallel to one another. In order to realize the above-mentioned countercurrent principle in a particularly simple manner, the cooling loops include two cooling tubes extending in parallel. In some embodiments, the two cooling tubes are close to one another or immediately side by side. A temperature gradient exists in a cooling tube from entry into the cooling plate until the exit from the cooling plate. Such uneven heat-emission distribution may be compensated, at least partially, by a second cooling tube extending in parallel and a coolant flowing in the opposite direction.

The cooling plate may have a baseplate and a cover, which are interconnected, optionally fastened with screws, whereby one or more recesses are fitted into the baseplate in order to receive one or more cooling tubes, and into which, the cooling tubes are inserted. In this manner, a stable cooling plate with protected cooling circuits is created, and is particularly suitable as a stabilizing housing component.

In some embodiments, the side panels of the battery housing may be or are screwed together in order to enable easy installation and deinstallation of the battery housing with sufficient stability.

In some embodiments, the battery housing has one or more gas discharge openings, which serve as ventilation openings when a battery cell becomes defective. When certain batteries are overloaded, compensation reactions may occur, resulting in, e.g., decomposition of water and formation of detonating gas. One or more openings for degassing the defective battery cells increase battery safety.

A control module unit for controlling the battery may be attached at the outside at the battery housing, and may be on one or more side panels. Wiring of the battery with an external and/or externally fitted control unit may thus be achieved in a simple manner with a partially opened battery housing.

The above object is, furthermore, achieved by a battery-installation procedure, in which a battery housing is made available, as explained above, as is a battery having a functional plate. Subsequently, the battery and the battery housing are assembled, such that the battery is held by the side panels of the battery housing, whereby the functional plate is inserted into the recesses of the side panels. Subsequently, the battery housing is closed by mounting one or both cover plates.

Thus, consistent with embodiments of the disclosure, battery installation work may be done with a partially opened battery housing, i.e., with either or both cover plates opened. This allows safety to be substantially increased during installation, as described above. In the production of high-voltage batteries, the number of components that need to be combined in a predefined sequence is not insignificant, while safety aspects, such as "live-line working" or "working under high voltage" are allowed. Both the battery housing and the installation procedure were developed with this in mind, and are applicable for industrialization, including large-scale production.

Part of the battery installation work may involve equipping the cooling plate with one or more battery blocks comprising battery cells. Because of the self-supporting battery housing, assembling the cooling plate may be done with a partially opened battery housing, which simplifies the assembly of the battery and the battery housing.

In particular, one or more cell blocks may be equipped with battery cells. Next, contact plates of terminal-connection plates may be mounted, e.g., fastened with screws on the positive and negative sides of the battery cells. This is followed by bonding the negative side of the battery cells with the corresponding contact plate. Bonding may be done by means of wire bonding, soldering, etc. In any housing, bonding causes an electrical connection between the negative terminals of the battery cells and the corresponding contact plate. The cell blocks bonded in this way on the negative side are subsequently fastened on the cooling plate, which may be already present in the battery housing. In this case, this is done at the partially opened battery housing. Subsequently, the positive terminals of the battery cells are bonded with the respective contact plates.

An advantage of the disclosure is that the cooling plate may be equipped on both sides with cell blocks, thereby improving space utilization and optimizing output yield.

Although the disclosure is suitable for application in a vehicle, such as a hybrid or an electric vehicle, one of ordinary skill in the art would understand that the disclosure may also be implemented in other fields, e.g., transportation, such as aviation and navigation, building services, etc.

Moreover, further advantages and features of the disclosure are explained in the following description of embodiments. The features described there may be implemented separately or in combination with one or more of the above-mentioned features, provided the features are not inconsistent with one another. The following description of the embodiments is made with reference to the accompanying drawings.

BRIEF DESCRIPTION OF THE DRAWINGS

FIGS. 11a-11d show details of the cell fixation.

DESCRIPTION OF THE EMBODIMENTS

Figure 1:
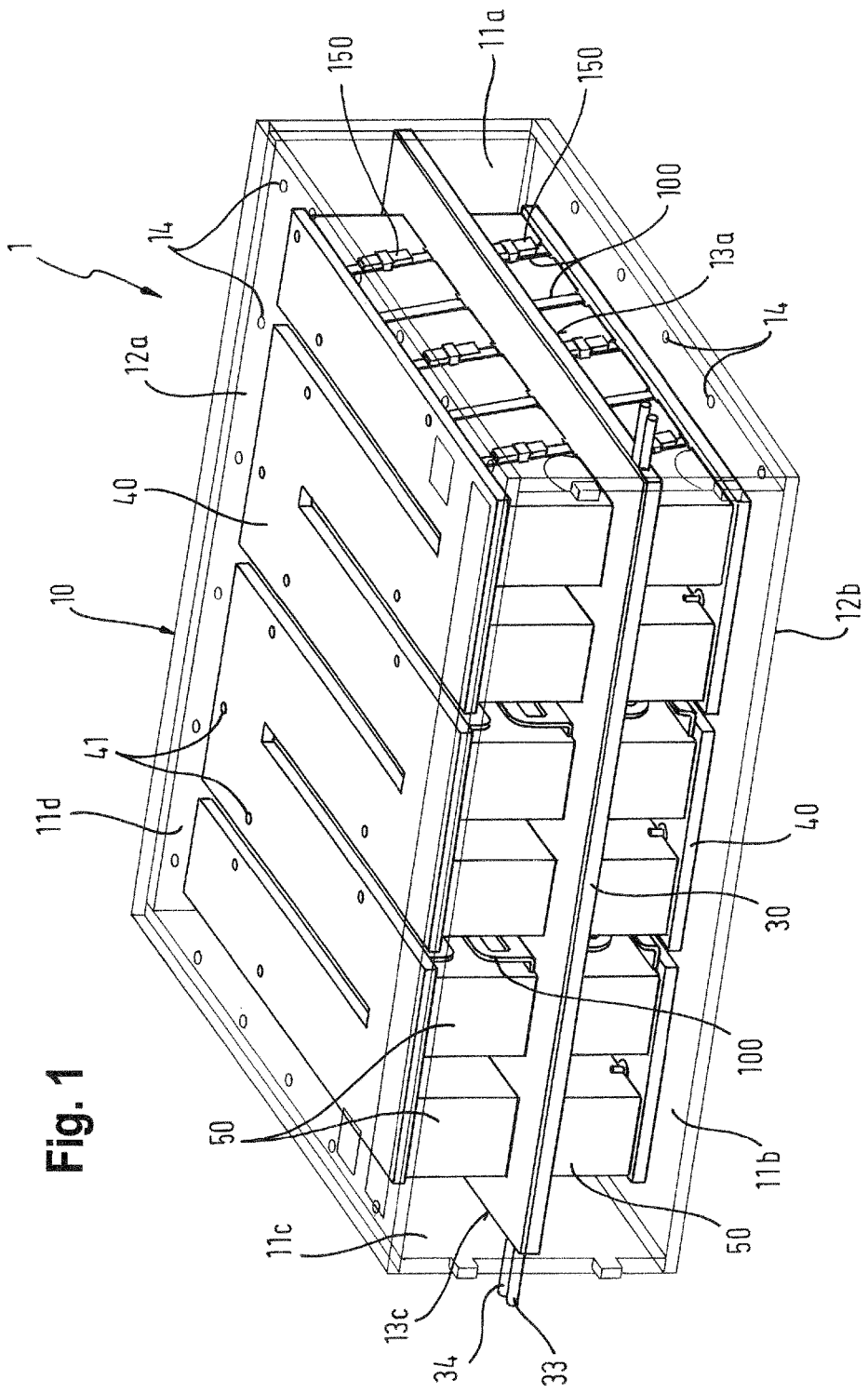
FIG. 1 is a perspective view of the overall structure of a battery.

FIG. 1 shows an overall structure of a battery 1. The battery 1 is enclosed by a battery housing 10, which is drawn transparently in order to illustrate the inner structure of the battery 1.

The battery housing 10 has four plate-shaped side panels 11a to 11d, as well as two cover plates 12a and 12b, which are interconnected to form a box-shaped housing. The lower cover plate 12b is also referred to as the base plate. The two side panels 11a and 11c each have an elongated recess 13a and 13c, into which a cooling plate 30, to be described later, of battery 1 is fitted.

Figure 12A:
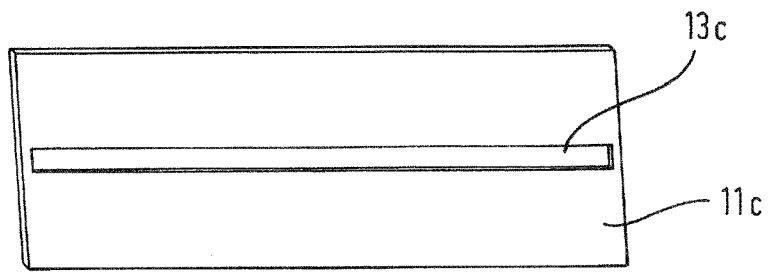
FIGS. 12a-12c show the structure of a self-supporting battery housing.
Figure 12B:
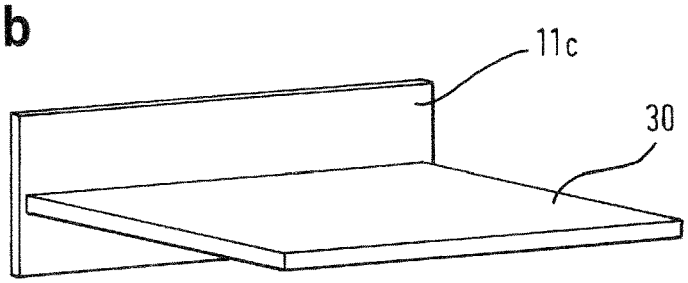
Figure 12C:
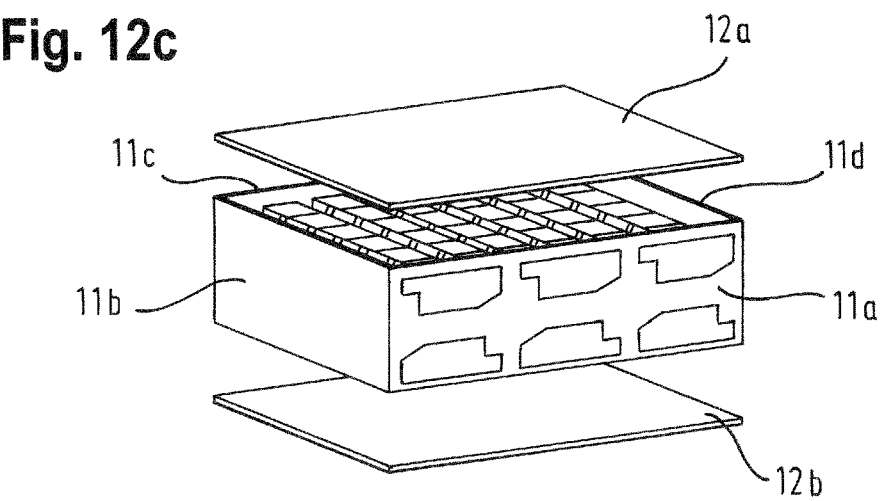

An exemplary structure of the battery housing 10 is shown in FIGS. 12a-12c. FIG. 12a shows the recess 13c of side panel 11c, into which the cooling plate 30 of battery 1 is inserted and/or fitted, as shown in FIG. 12b. The cooling plate 30 and recesses 13a and 13c thus interact as a groove and a spring. The recesses 13a and 13c may be milled, cut, and impressed or fitted in some other fashion into the side panels 11a and 11c.

The side panels 11a-11d, along with the fitted cooling plate 30, optionally supporting further battery components, are screwed together or otherwise fastened, such that the battery 1 is held exclusively by the interconnected side panels 11a-11d. The cover plates 12a and 12b stabilize, but do not contribute to the support of the actual battery, i.e., in this sense, the housing is self-supporting. All four side panels 11a-11d thus hold the whole battery, without the installed cover plate 12a and base plate 12b. In this manner, battery pre-wiring can be done from either side at a pre-installed housing, but nevertheless accessible from above and below. Maintenance work on the battery levels may be done, as needed, from above or below, without the need for removing the whole system from its installation space.

In the housing 10, openings 14 are provided, which serve as degassing openings in the case of degassing. In some embodiments, the openings are provided on the cover plate 12a and/or the base plate 12b. When certain batteries are overloaded, compensation reactions may occur, resulting in, e.g., decomposition of water and formation of detonating gas. The openings 14 degas defective battery cells, not shown in FIG. 1, thus increase battery safety.

Furthermore, openings are provided in the housing 10 for cooling lines 31 and 32 of cooling plate 30. In addition, connecting and/or positioning devices may be provided in or on the battery housing 10 in order to allow modular connection of several batteries shown in FIG. 1 (e.g., stacking) and/or mounting battery 1 in a vehicle. Battery 1, shown here, is operational and ready for use as a separate component, and is also combinable with one or more batteries in a modular fashion.

FIG. 1 shows elongated cell-block locks 50 that include several adjacent cell blocks 60, which in turn contain several battery cells 70. The cell blocks 60 comprising the battery cells 70 are not shown in FIG. 1. Adjacent cell-block locks 50 are electrically interconnected with the terminal-connection plates 100. The right-hand side of FIG. 1 shows further terminal-connection plates 100 of a different type, which electrically interconnect adjacent cell blocks 60. In the structure of FIG. 1, every other terminal-connecting plate 100, which interconnect adjacent cell blocks 60, 150, carries a sensor.

While the cell-block locks 50 are arranged on top and below in mirror-inverted fashion on the cooling plate 30, an end plate 40 closes the cell-block locks 50 on the side opposite the cooling plate 30. The end plates 40 also have openings 41, which in the case of a battery-cell defect serve as degassing openings.

Figure 2:
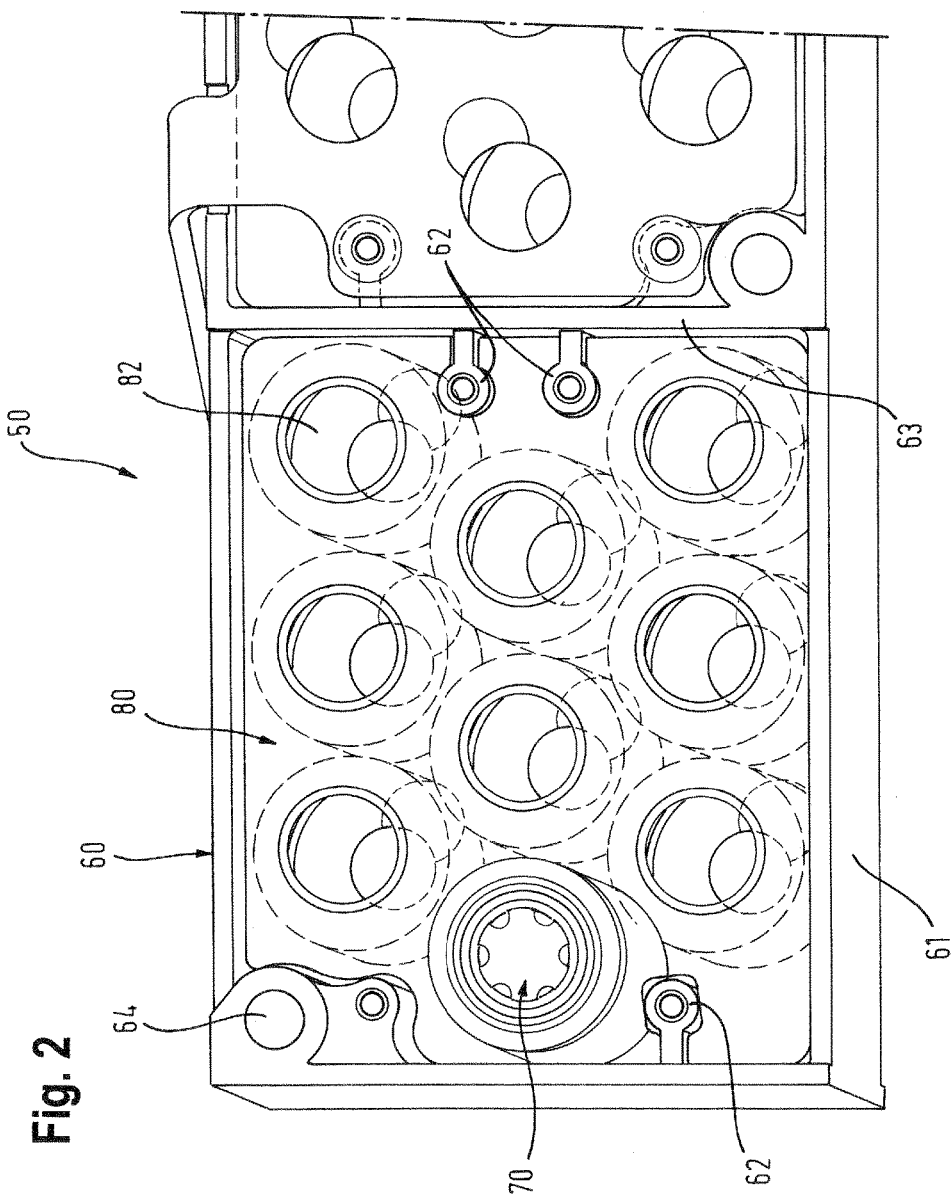
FIG. 2 is an oblique top view of a cell block of the battery.

FIG. 2 shows a cutout of a cell-block lock 50 having several cell blocks 60. In housing 61 of the cell block 60, a cell fixation 80 is present, which fixes several battery cells 70 from above. In the present housing, nine battery cells 70 are provided per cell block 60. The battery cells 70 may have a diameter of approximately 20 mm and a length of approximately 50 mm. Thus, by assembling nine battery cells 70 per cell block 60, a cell-block dimension of, e.g., 70 mm×55 mm×55 mm or so is obtained. These parameters are, of course, only meant as examples, although they ensure an excellent volume/performance ratio and/or weight/performance ratio when applied in an electric or hybrid vehicle. The structure of the cell fixation 80 is described in more detail further below. At the housing 61 end stops 62 are provided for positioning and, optionally, fixation of the cell fixations 80 on the cell-block lock 50. Several cell blocks 60 are provided for each cell-block lock 50. The individual cell blocks 60 are separated from one another by partition walls 63 of the housing 61. The housing 61 may provide further elements, e.g., fastening elements 64 for fastening the end plate 40 in the battery housing 10.

Figure 3:
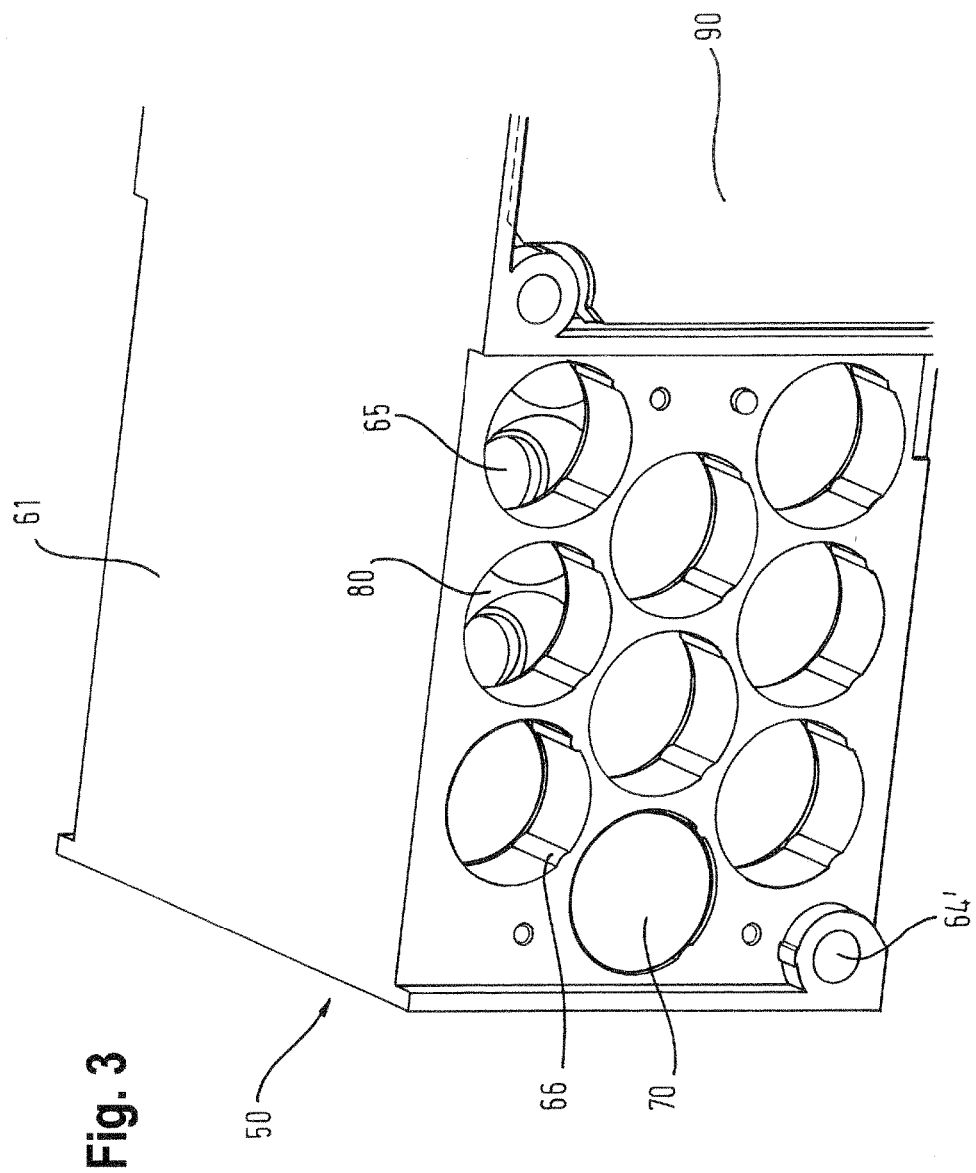
FIG. 3 is an oblique bottom view of a cell block of the battery.

An oblique bottom view of the cutout of a cell-block lock 50 is shown in FIG. 3. The housing 61 has a bottom surface, in which the cell-insertion openings 65 are placed. The battery cells 70 are pushed and/or pressed into the cell-insertion openings 65. Moreover, ridges 66 may be provided in the cell-insertion openings 65 for better retention, which ridges may become either elastically or plastically deformed when the battery cells 70 are inserted, thereby providing firm retention of the battery cells 70 at the bottom of the housing 61. Fixation means 64', e.g., for screwing the housing 61 together with the cooling plate 30, are provided.

Figure 5:
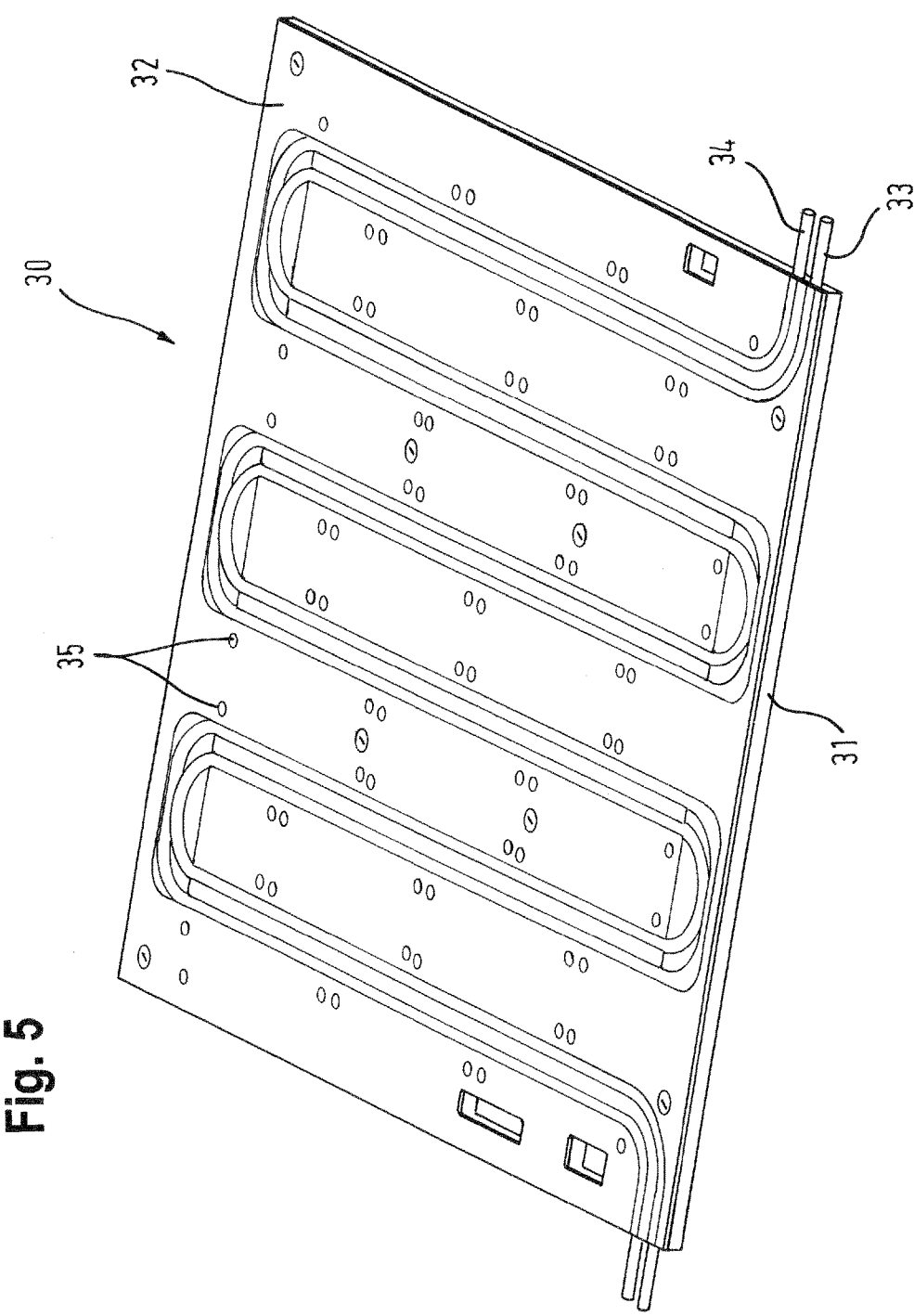
FIG. 5 shows a cooling plate for use in the battery.

A more detailed view of the cooling plate 30 is shown in FIG. 5. The cooling plate 30 has a baseplate 31 and a cover 32, which are fastened to one another, e.g., screwed, stuck, clipped and/or glued together. In some embodiments, the cooling plate 30 is about 8-10 mm thick. Tubes 33 and 34 are inserted into the baseplate 31 of the cooling plate 30 in recesses appropriately provided for this purpose. For a more uniform cooling efficiency, the two cooling tubes 33 and 34 work according to the countercurrent principle, i.e., the coolant contained therein, e.g., glycol, flows in opposite direction in the two pipes 33 and 34. Thus, any cooling gradient due to an increase in the temperature of the coolant from entry into the cooling plate 30 until exit from the cooling plate 30 is minimized. The baseplate 31 and the cover 32 made of, e.g., a sturdy plastic, are screwed together. The cooling plate 30 has openings 35 for fastening of the cell-block locks 50 on the cooling plate 30. In this regard, the cooling plate 30 also serves as a carrier of battery components. The cell-block locks 50 are fastened on cooling plate 30 with their lower surface, i.e., the surface shown in FIG. 3. In some embodiments, battery cells 70 are aligned, such that the flat negative terminal is in contact with the cooling plate 30 in a heat-conductive manner, optionally by a conductive adhesive and/or gap filler, described in more detail below. Thus, the cooled surface of the battery cells 70 can be maximized. Also, the flat negative side of battery cell 70 is generally less sensitive than is the rounded positive side, which simplifies the assembly, in which the battery cells 70 are aligned as shown here. Optionally, the cooling plate 30 may have openings, which serve as degassing openings when the battery cells 70 become defective.

Figure 7A:
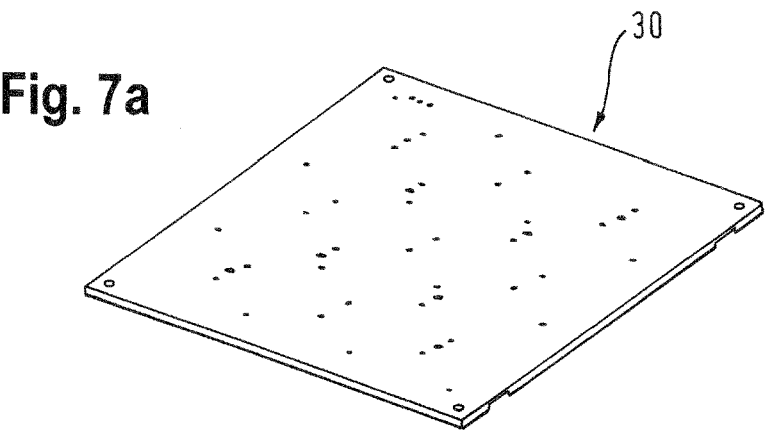
FIG. 7a shows a cooling plate structure.
Figure 7B:
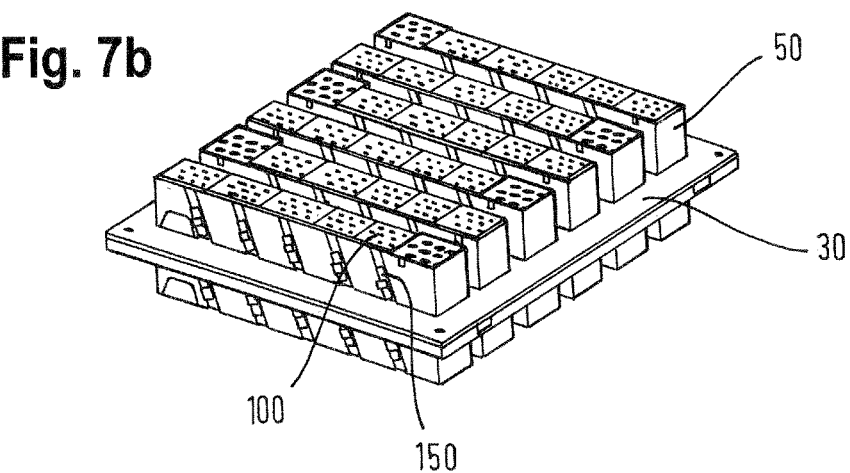
FIG. 7b shows cell-block levels arranged in mirror-inverted fashion.
Figure 7C:
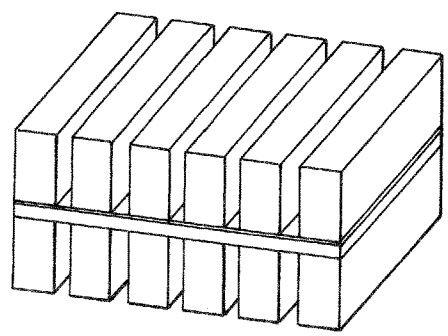
FIG. 7c shows a thermal simulation of the structure in FIG. 7b.

FIG. 7a schematically shows a cooling plate 30, which, as shown in FIG. 7b, is equipped with cell-block locks 50. Furthermore, FIG. 7b shows the terminal-connection plates 100, described further below, being equipped with sensors 150. A simulated temperature distribution for the two levels of the cell-block locks 50, which share a single cooling plate 30 above and below, respectively, is shown in FIG. 7c.

Figure 4:
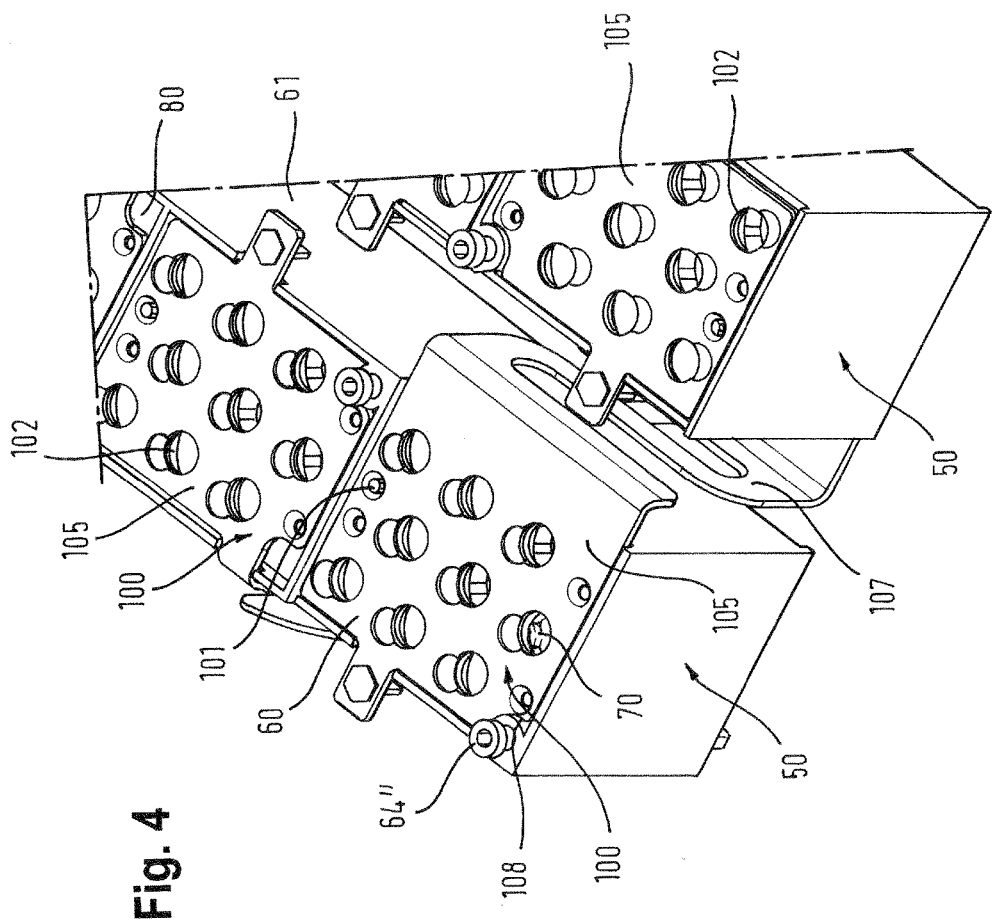
FIG. 4 shows the connection of two cell-block locks by means of a terminal-connection plate.

FIG. 4 shows a cutout of two cell-block locks 50, seen obliquely from above. The structure shown in FIG. 4 roughly matches that in FIG. 2, in which cell fixations 80 are provided on the terminal-connection plates 100. FIG. 4 shows two types of terminal-connection plates 100, i.e., those that connect two adjacent cell blocks 60 with one another, and those that connect two adjacent cell-block locks 50 with one another. The terminal-connection plates 100 are connected via the fixation means 101 with the cell blocks 60. The terminal-connection plates 100 may be, e.g., screwed, stuck, glued together or fastened in some other fashion. The terminal-connection plates 100 have contact plates 105 and 106, which are provided parallel to one other, as shown more clearly in FIG. 6a. The contact plates 105 and 106 have openings 102 making it possible to access battery cells 70. Furthermore, in the installed condition, the positions of the openings 102 of the upper contact plate 105 match the positions of the openings 82 of the cell fixations 80. An electrical connection between the terminal-connection plates 100 and the battery cells 70 may be made via the openings 102 in the contact plates 105 and 106 in the pre-installed condition of the terminal-connection plates 100, e.g., by means of wire bonding. Rear bonding by means of a bonding wire 103 is shown in FIG. 8b. Moreover, defective electrical connections between contact plates 105, 106 and battery cell 70 may be restored in a simple manner because of the openings 102, without removing the pole-connecting plate 100. Bonding in the pre-installed condition enhances safety during installation in case of any short-circuits or other electrical defects. Moreover, the openings 102 may serve as degassing openings in case of a defective battery cell. To simplify the installation of the roughly rectangular contact plates 105 and 106 on a cell block 60, one or more edges 108 of the contact plates 105 and 106 may be beveled or notched, as shown in FIG. 4. Here, a concave notch in an edge 108 of the upper contact plate 105 is useful for adjusting the fixation means 64 with a screw 64".

The two contact plates 105 and 106 of the terminal-connection plate 100 are electrically conductive and connected conductively with one or more battery cells 70 of a cell block 60. The two contact plates 105 and 106 are interconnected via a connecting bridge 107. In the present embodiment, the contact plates 105 and 106 and the connecting bridge 107 form an integral piece. The terminal-connection plate 100 is produced, e.g., by punching out a basic form from a metal sheet and subsequently bending the contact plates 105 and 106. The rear contact plates 106 are not shown in FIG. 4.

Figure 6A:
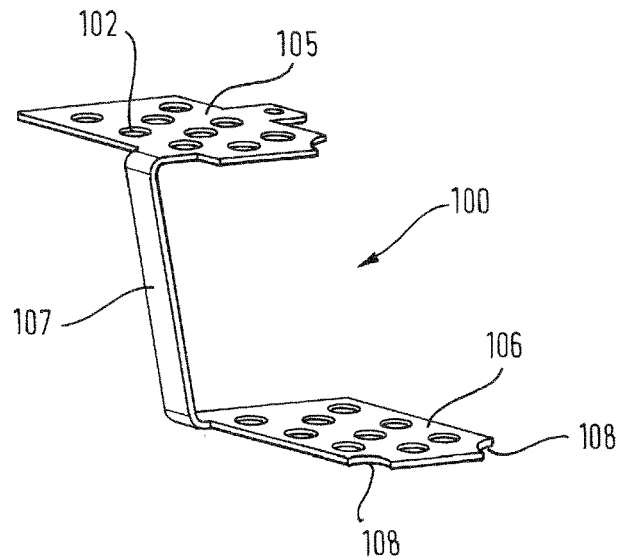
FIGS. 6a-6c show a terminal-connection plate separately and in connection with a cell-block lock.

A detailed drawing of the terminal-connection plate 100 is shown in FIG. 6a. The two contact plates 105 and 106 are arranged parallel to one another and interconnected by connecting bridge 107, whereby they appear offset to one another in plan view. In this manner, the adjacent battery cells 70 are electrically interconnected. In this regard, the diagonally connected contact plates 105 and 106 enable a serial connection of the cell blocks 60, when the battery cells 70 are directly aligned in terms of polarity. The uniform alignment of the battery cells 70 enables optimal cooling, as all battery cells 70 with the flat negative terminal may be brought into contact with the cooling plate 30. Furthermore, the uniform alignment of the battery cells 70 allows for simplified production, as the assembly of the individual cell blocks 60 and cell-block lock 50 may be done mechanically and with the less sensitive negative terminal facing down.

Figure 6B:
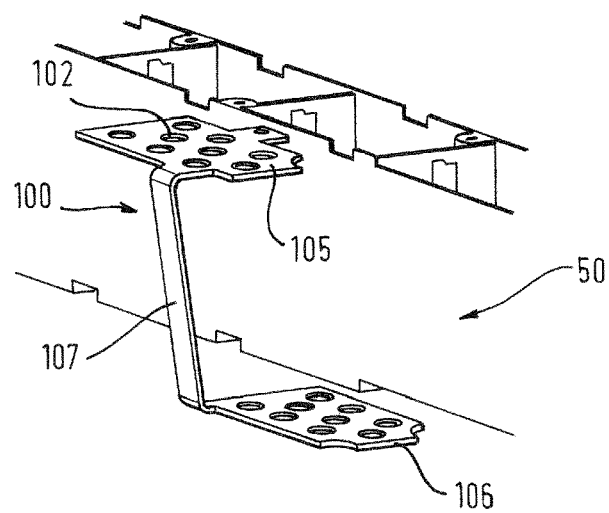
Figure 6C:
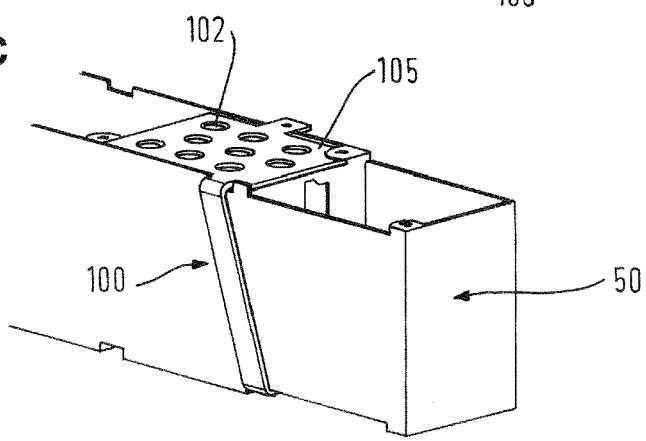

The mounting of the terminal-connection plate 100 on the cell-block lock 50 is shown in FIGS. 6b and 6c. The upper contact plates 105 rest substantially flatly on the corresponding cell fixation 80 of a cell block 60. The connecting bridge 107 extends along an external wall of the cell-block lock 50, without substantially increasing the need for space. Below, the contact plates 106 are in electrical contact with the negative terminals of the battery cells 70. Moreover, the contact plates 105 and 106 are bent in the same direction relative to the connecting bridge 107, such that the lateral profile of the terminal connection plate is U-shaped. In the case of a terminal-connection plate 100, which interconnects adjacent cell-block plates 50, the contact plates 105 and 106 are bent in opposite directions, as shown in FIG. 4.

Figure 6D:
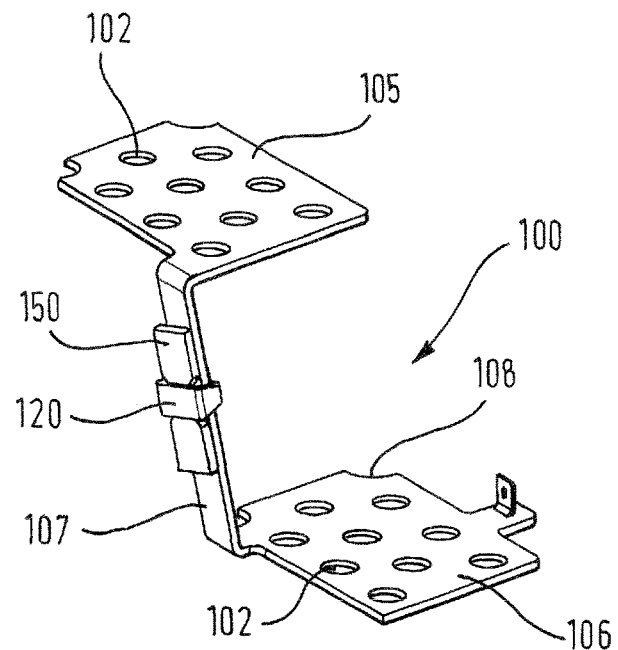
FIG. 6d shows a terminal-connection plate with a sensor mounted thereon.
Figure 6E:
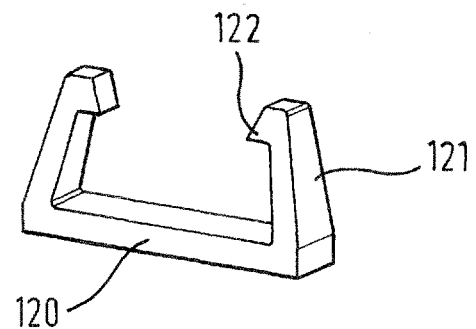
FIG. 6e shows a sensor-mounting device designed as a clip.
Figure 6F:
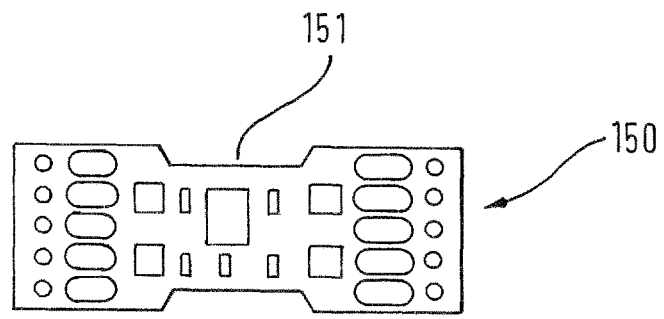
FIG. 6f shows a sensor.

As is shown in FIG. 6d, a sensor-mounting device 120 is provided on the connecting bridge 107 of the terminal-connection plate 100, which is equipped with a sensor 150. The sensor-mounting device 120 is a clip, which is shown as enlarged and in perspective view in FIG. 6e. The clip 120 is a U-shaped plastic part, whose upper open ends 121 are both provided with a hook-shaped projection 122. The clip 120 grips the sensor 150 mid-way, as shown in FIG. 6f. Moreover, the sensor 150 has notches 151, into which both clip arms 121 engage. In the present case, the sensor 150 is an integrated electronic component with a circuit board, a temperature sensor and electronic components, as indicated schematically in FIG. 6f. The clip 120 grips sensor 150 and the connecting bridge 107, and due to the elasticity of the plastic of which the clip 120 is made, clings tight with its projections 122 behind the connecting bridge 107. In some embodiments, the connecting bridge 107 of the terminal-connection plate 100 has one or more impressions, such that slipping of the clip 120 along the connecting bridge 107 is prevented.

Figure 8A:
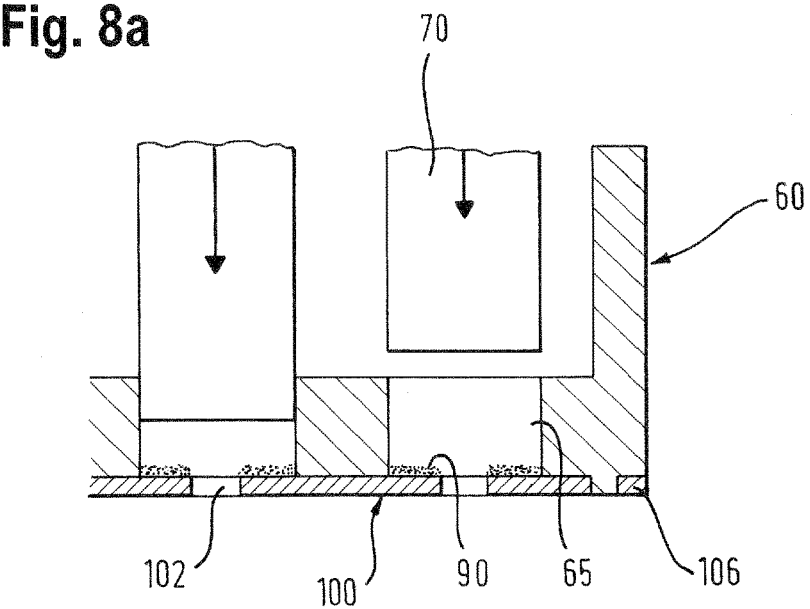
FIGS. 8a and 8b show the placement of battery cells into a cell housing and bonding of the battery cells on the bottom of the cell housing in order to create a cell block.
Figure 8B:
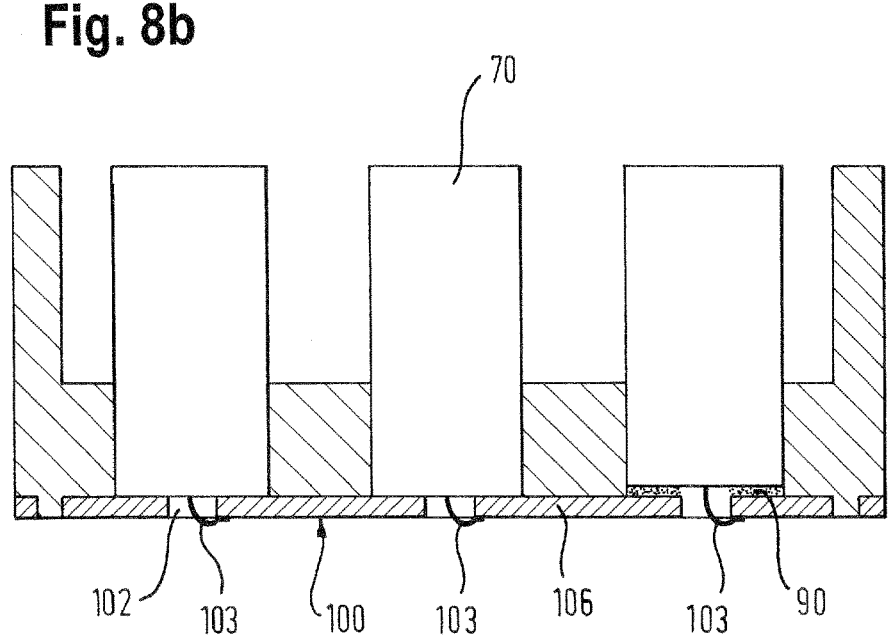

FIGS. 8a and 8b show the insertion procedure of the battery cells 70 in the base of the housing 61 of a cell block 60. In some embodiments, insertion is performed mechanically. The bottom of the housing 61 has several openings 65 (in the present embodiment, nine per cell block 60). The battery cells 70 are pressed in from above into the openings 65. Before this process, a conductive adhesive 90 was placed on the terminal-connection plate 100. In FIG. 8b, the conductive adhesive 90 is shown only below battery cell 70 on the external right-hand side in order to illustrate how the battery cells 70 are pressed onto the terminal-connection plates 100. FIG. 8b shows bonding wires 103, which connect the terminal-connection plate 100 with the flat negative terminal of battery cell 70. Following the procedure of insertion into the housing 61, planar contact is ensured due to the gluing with the conductive adhesive 90. Due to the conductive adhesive compound, excellent heat dissipation occurs via the terminal-connection plate 100, in contrast to the situation, in which the conductive adhesive 90 is not used. The conductive adhesive 90 is also shown in FIG. 3. Due to the mechanical insertion of the battery cells 70, optionally with the interaction of the ridges 66 of FIG. 3, the quality of the contact between the cathode side of the battery cells 70 and the terminal-connection plate 100 remains constant.

Figure 9A:
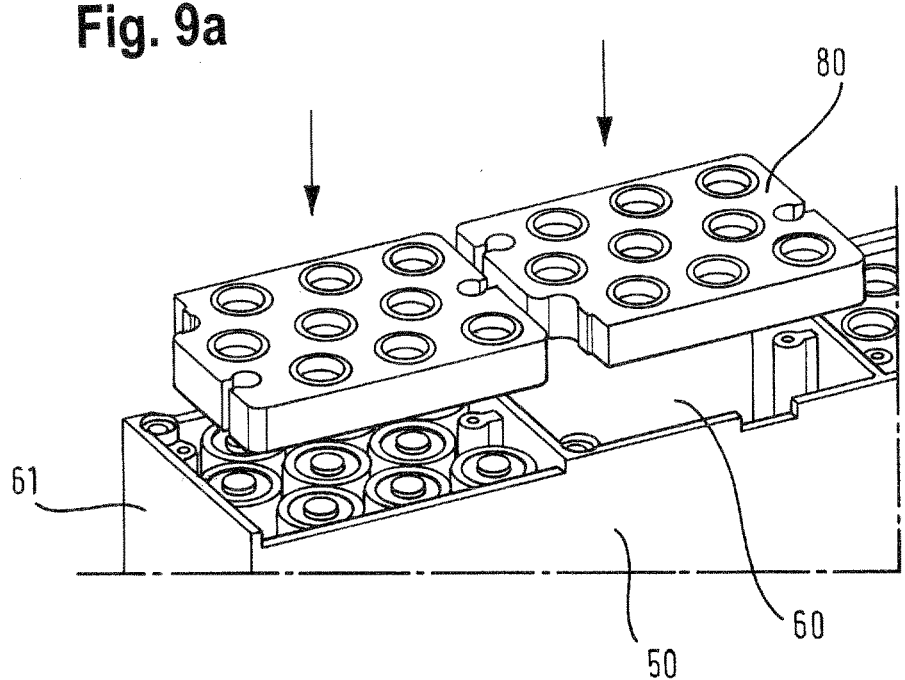
FIGS. 9a and 9b show cell fixations before and after installation.
Figure 9B:
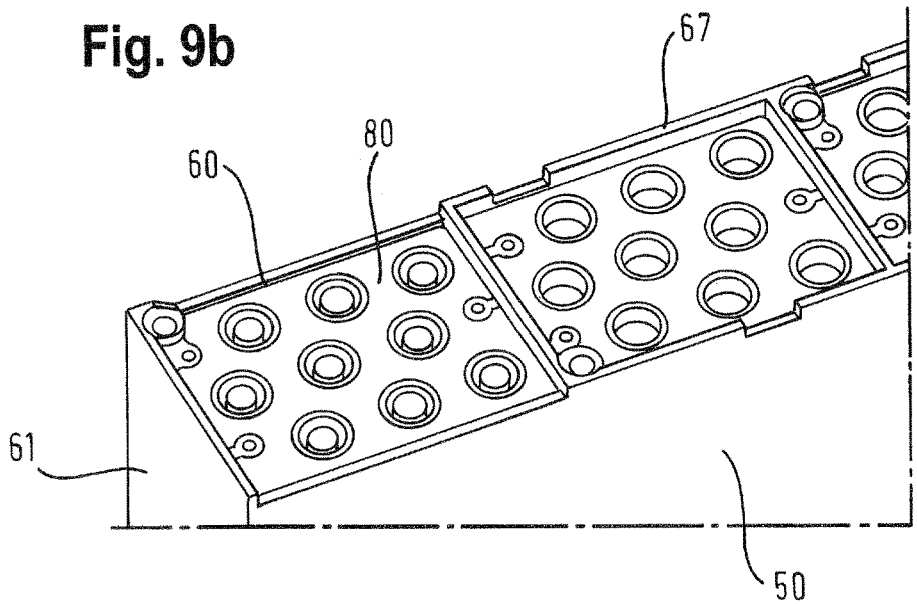

In the following, fixation of the battery cells 70 into a precise position with the aid of the above-mentioned cell fixations 80 is described. FIGS. 9a and 9b represent a cell-block lock 50 seen obliquely from above. FIG. 9a shows the cell fixation 80 before installation, while FIG. 9b shows the situation after installation. The substantially rectangular cell fixations 80 are pushed into the housing 61 of cell block 60. The insertion depth of the cell fixations 80 may optionally be predefined by an end stop not shown in FIGS. 9a and 9b. Additionally, locking in the end position may be provided. By locking the cell fixation 80 in the housings 61, optionally with the aid of latches, a defined installation space height along the mechanically inserted battery cells 70 is created. Furthermore, due to the internal geometry of the cell fixations 80, tolerance compensation is made possible along the longitudinal axis of the battery cells 70. The cell fixation 80 may be implemented as a soft and/or rigid component.

Figure 11A:
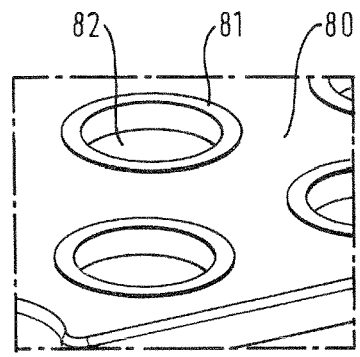
Figure 11B:
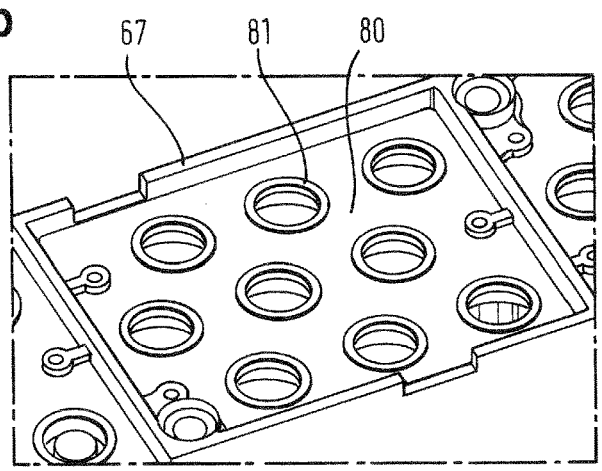
Figure 11C:
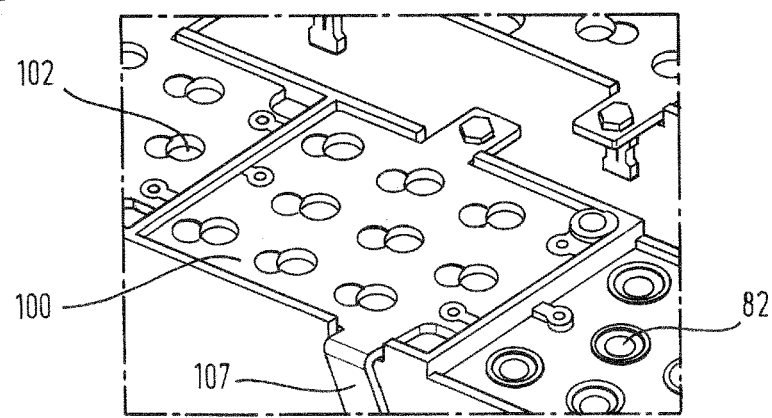

FIGS. 11a to 11c represent detail views of the cell fixation 80. The cell fixations 80 have openings 82, which fix the battery cells 70 and allow for access to the battery cells 70 after pre-installation of the cell fixations 80 and contact plates 105. As the openings 82 are provided primarily for electrical contacting of the contact plates 105 with the positive terminals of battery cells 70, they are likewise referred to as bond openings 82. A circular collar 81 is provided around the openings 82. Due to the circular collar 81, completely flat mounting of the terminal-connection plates 100 over the whole corresponding surface of the cell fixation 80 will not occur, whereby in the installed condition improved damping of vibrations is enabled, which, among other things, contributes to a more durable bond between the battery cells 70 and contact plates 105. The cell fixation 80 may be implemented as a 2K part for improved vibration damping and/or tolerance compensation.

A schematic sectional view of the layer structure is shown in FIG. 11d. There, the battery cell 70 of the cell fixation 80 is fixed from above. The upper contact plate 105 of the terminal-connection plate 100 is placed on the cell fixation 80. Below, the battery cell 70 rests upon on the lower contact plate 106 of the terminal-connection plate 100, optionally with the aid of a conductive adhesive 90, not shown in FIG. 11d. The collar 81 around the bond opening 82 is shown in FIG. 11d. Moreover, a collar 83 may be provided on the lower side of the bond opening 82, ensuring clean mounting on battery cell 70. The battery cell 70 may optionally have corresponding projections and/or collars in order to provide secure fixation and mounting. The depicted collars 81 and 83 allow for improved distribution of force around the opening, along the cell axis. While the cell fixation 80 may be made of a hard 2K-injection molding part, the collar 81 and/or 83 may be made of a soft plastic component, thereby improving the tolerance compensation along the cell axis.

Figure 10:
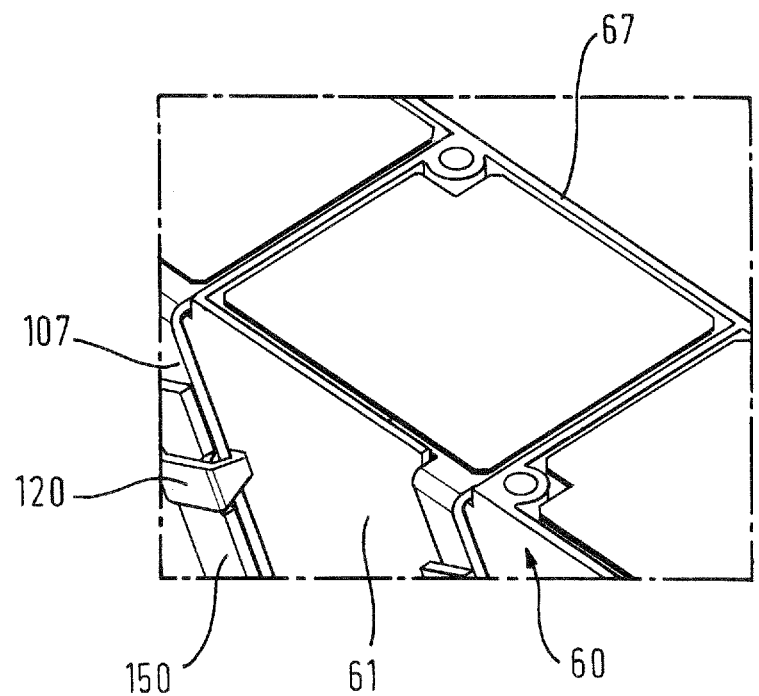
FIG. 10 is an oblique bottom view of a closed cell block, showing a collar for galvanic separation of the terminal-connection plates for the cooling plate.

In FIGS. 9b, 11b, 10 and others, a circular non-continuous collar 67 of the housing 61 of the cell block 70 is shown. Uneven compression and thus damage to the underlying bond connections are prevented by this circular collar 67, which ensures a defined distance from the cooling plate 30, when the cell-block lock 50 is screwed on. As an alternative or in addition to the conductive adhesive 90, a so-called gap filler 91 may be provided, which ensures galvanic separation of terminal-connection plates 100 from the cooling plate 30. The gap filler 91 is indicated in FIG. 11d. The gap-filler material is inserted as a common part between each terminal-connection plate 100 and the cooling plate 30.

In the production of the depicted high-voltage battery, the number of individual components that need to be combined in a predefined sequence is not insignificant, while safety aspects, such as "live-line working" or "working under high voltage" are allowed. The depicted battery structure makes safe installation possible in this regard. A exemplary installation sequence is as follows:

1. Assembling the cell blocks 60 of a cell-block lock 50 with battery cells 70.
2. Fastening the terminal-connection plates 100 with screws.
3. Bonding the notch on the negative side.
4. Installing all cell-block locks 50 of a battery level with the cathode side on cooling plate 30.
5. Bonding the pre-installed completed battery level on the positive side.

In some embodiments, the above sequence may be performed on the uncovered bottom side of the cooling plate 30 in order to mount a second battery level.

The technical solutions for assembling and producing a high voltage battery, in particular assembling the cell-block locks 50, which may be done mechanically, make it possible to utilize this method, including for large-scale production. Notches bonded on the cathode side are made on the cooling plate 30, such as immediately after bonding, in order to protect the bonding sites, such that the risk of damage during transport, etc., is minimized. "Short-circuiting" of the pre-bonded cell-block lock 50 is avoided, as the serial connection remains interrupted (positive side not yet bonded, at this time) during installation on the cold plate 30, thereby enhancing installation safety.

More Description of the Battery Housing 10 and the Battery Installation

The battery housing 10 has four plate-shaped side panels 11a-11d, and two cover plates 12a, 12b. All six housing components 11a-11d, 12a, 12b are combinable or were combined with one another to form a box-shaped housing. At least two opposite side panels 11a, 11c each have an elongated recess 13a, 13c, into which a functional battery plate, e.g., a cooling plate 30, is insertable or has been inserted. In some embodiments, each side panel 11a-11d has a notch, into which the functional plate is inserted or was inserted. The functional battery plate thus contributes to the stabilization of the battery housing 10, even when the battery housing 10 is not completely closed. Moreover, the side panels 11a-11d are optionally interconnected with the aid of the functional plate, such that they hold the whole battery without installed cover plates. All four side panels 11a-11d hold the whole battery without installed cover plates; in this sense, the battery housing 10 is self-supporting.

The battery housing 10 allows for installation and/or maintenance work on the battery, which is accessible from the top and/or bottom. Removing the whole system from its installation space is therefore not required. In particular, wiring of the battery, when installed in the battery housing 10, is possible, whereby safety is substantially enhanced, especially for the application of a high-voltage battery for vehicles. The advantages achieved with the disclosure explained above may be achieved by a simple structure of the battery housing 10, which is desirable in terms of productivity.

In some embodiments, the four side panels 11a-11d are interconnected, whereby a battery cooling plate 30 is inserted into the recesses 13a, 13c as a functional plate. In such embodiments, the battery cooling plate 30 is used to dissipate heat from the battery, as well as serving as a stabilizing "housing" component, whereby a synergetic effect is achieved in this regard.

In some embodiments, two independent cooling circuits are provided in the cooling plate 30, which operate according to the countercurrent principle, thereby obtaining a more homogeneous temperature distribution in the battery 1. In some embodiments, the heat dissipation through the cooling plate 30 occurs on the cathode side of the battery 1.

In some embodiments, two cooling tubes 33, 34 are fitted into the cooling plate 30, and extend substantially parallel to one another. In order to realize the above-mentioned counter-current principle in a simple manner, the cooling loops include the two cooling tubes 33, 34 extending in parallel, and in some embodiments close to one another or immediately side by side. A temperature gradient exists in one of the cooling tubes 33, 34 from entry into the cooling plate 30 until exit from the cooling plate 30. Such an uneven heat-emission distribution may be compensated, at least partially, with the other one of the cooling tubes 33, 34 extending in parallel, and a coolant flowing in the opposite direction.

In some embodiments, the cooling plate 30 has a baseplate 31 and a cover 32, which are connected to one another, in some embodiments fastened by screws, whereby one or more recesses are fitted into the baseplate 31 in order to receive one or more of the cooling tubes 33, 34, and into which, the cooling tubes 33, 34 are inserted. Thus, a stable cooling plate 30 with protected cooling circuits is created, such that it is particularly suitable as a stabilizing housing element.

In some embodiments, the side panels 11a-11d of the battery housing 10 may be or are already screwed together in order to enable easy installation and deinstallation of the battery housing 10 with sufficient stability.

In some embodiments, the battery housing 10 has one or more gas discharge openings 14, which in the case of a defective battery cell 70 serve as ventilation openings. When certain batteries are overloaded, compensation reactions may occur, resulting in, e.g., decomposition of water and formation of detonating gas. One or more openings 14 for degassing defective battery cells 70 thus enhance the safety of the battery.

In some embodiments, a control module unit for controlling the battery 1 is mounted outside on the battery housing 10, and in some embodiments on one or more side panels 11a-11d. Wiring of the battery 1 with an external and/or externally fitted control unit may thus be accomplished in a simple way with a partially opened battery housing 10.

With a general procedure for installing a battery, a battery housing 10 is provided, as explained above, in addition to a battery 1 having a functional plate. Subsequently, the battery 1 and the battery housing 10 are assembled, such that the battery 1 is held by the side panels 11a-11d of the battery housing 10, whereby the functional plate is inserted into the recesses of the side panels 11a, 11c. Following this, the battery housing 10 is closed by mounting one or both cover plates 12a, 12b.

Installation work may be done on the battery 1 with a partially open battery housing 10, i.e., on one or both opened cover plates 12a, 12b. This allows safety to be substantially enhanced during installation, as described above. In the production of high-voltage batteries, the number of components that need to be combined in a predefined sequence is not insignificant, while safety aspects, such as "live-line working" or "working under high voltage" are allowed. Both the battery housing 10 and the installation procedure were developed with this in mind, and are applicable for industrialization, including large-scale production.

Part of the battery installation work may involve equipping the cooling plate 30 with one or more battery blocks 60 having battery cells 70. Due to the self-supporting battery housing 10, assembling the cooling plate 30 may be done with a partially opened battery housing 10, which simplifies combining the battery 1 with the battery housing 10.

In some embodiments, one or more cell blocks 60 are equipped with battery cells 70. Subsequently, contact plates 105, 106 of terminal-connection plates 100 may be mounted, e.g., fastened with screws, on the positive and negative sides of the battery cells 70. Following this, bonding of the negative side of the battery cells 70 with the corresponding contact plate 106 is done. Bonding may be done by wire bonding, soldering, etc. At any rate, due to bonding, an electrical connection between the negative poles of the battery cells 70 and the corresponding contact plate 106 is established. The cell blocks 60 thus bonded on the negative side are subsequently fastened on the cooling plate 30, which may be already present in the battery housing 10. In this case, this is done on the partially opened battery housing 10. Subsequently, the positive sides of the battery cells 70 are bonded with the corresponding contact plates 105.

An advantage of the disclosure is that the cooling plate 30 may be equipped on both sides with cell blocks 60, thereby improving space utilization and optimizing output yield.

More Descriptions of the Cell Blocks 60 and the Method of Assembling the Cell Blocks 60

The cell block 60 has one or more battery cells 70, which are provided in a housing 61, which may be made of plastic. In some embodiments, the battery cells 70 are cylindrical cells, e.g., circular-cylindrical cells, which are bundled and may be connected in parallel in the housing 61 of cell block 60. In some embodiments, nine battery cells 70 are provided per cell block 60. Several cell blocks 60 may be combined into cell-block locks 50, whereby the individual cell blocks 60 of a cell-block lock 50 are, e.g., serially interconnected. When, for the sake of simplicity, describing (several) battery cells 70, this also includes the special case, in which the cell block 60 has only one single battery cell 70. Descriptions made on the basis of one battery cell 70 apply likewise to several or all battery cells 70. The cell block 60 has a box-shaped housing 61, which is open on one side. The battery cells 70 are inserted through the open side into the housing 61. Subsequently, the cell fixation 80 is pushed through the open side into the housing 61, such that the battery cells 70 are fixed in housing 61, and housing 61 with the cell fixation 80 at least partially closed. The cell fixation 80 may be a plate-shaped plastic component, which is pressed and/or pushed into housing 61 by the application of pressure. The cell fixation 80 has one or more bond openings 82, through which the battery cells 70 may be accessed, after the cell fixation 80 has been pushed in. In the housing, where the battery cells 70 are cylindrical formations, on whose both bottom surfaces, an electrical terminal is provided, i.e., the negative and positive terminal of the relevant battery cell 70, the bond openings 82 match the corresponding terminals (e.g., the positive terminals) of the battery cells 70 after the cell fixation 80 has been pushed in. Via the bond opening(s) 82, an electrical connection between the corresponding terminal of battery cell 70 and a contact plate 105 of a terminal-connection plate 100 may be established in a subsequent step, which is described in more detail below. A projecting collar 81 is provided, at least partially, around a bond opening 82 on the side of the cell fixation 80 facing away from the battery cells 70, such that the collar 81 may be brought into contact with an end plate, e.g., the contact plate 105 mentioned above.

With the collar 81 around one or more bond openings 82, (completely) flat mounting of the end plate upon the whole cell fixation 80 is avoided in the installed condition. Vibrational strains may thus be reduced during the bonding step. In addition, cell fixation 80 enables vibration damping during battery use, e.g., in the vehicle-installed condition. Particularly in vehicle applications, in which vibrations and impacts need to be taken into account in the development of vehicle components, the present arrangement is especially suitable, as the bond connections between battery cells 70 and the contact plates 105, 106 have excellent durability. Thus, the reliability of the battery is on the whole improved. Besides vibration damping, the cell fixation 80 allows for a more precise alignment of the battery cells 70 in the housing 61. Due to the collar 81 around the bond opening 82, the cell fixation 80 provides specific mounting points for an end plate, thus ensuring a defined distribution of force along the axis of the relevant battery cells 70.

In some embodiments, the end plate is a contact plate 105 of a terminal-connection plate 100, as already mentioned above. In this case, the terminal-connection plate 100 should be brought into conductive contact with battery cell 70, whereby the collar 81 is in (mechanical) contact with the non-conductive contact plate 105. Between the contact plate 105 and the relevant terminal of the battery cell 70, a bond concerning should be established later, e.g., by means of wire bonding, soldering, etc. The cell fixation 80 reduces the relative movements between the contact plate 105 of the terminal-connection plate 100 and the relevant battery cell 70 terminal, thereby further improving operational reliability and durability of the battery.

In some embodiments, the contact plate 105 has at least one opening 102, which matches a corresponding bond opening 82 of the cell fixation 80, such that bonding of the contact plate 105 with a corresponding battery cell 70 terminal can be done in the installed condition of the cell fixation 80 and the terminal-connection plate 100 through the two openings 102, 82. In this manner, the electrical connection between the contact plate 105 and the battery cell 70 may be done at the latest possible moment, thereby improving battery installation reliability. This advantage is especially useful in high-voltage batteries, as in the production of such high-voltage batteries, the number of components that need to be combined in a predefined sequence is not insignificant, while safety aspects, such as "live-line working" or "working under high voltage" are allowed. As the electrical connection between the battery cells 70 and the contact plates 105 is established only upon completed battery installation, the risk of short-circuits, etc., occurring during the installation of the battery can be reduced.

In some embodiments, the housing 61 of the cell block 60 has a base opposite the open side, into which base one or more cell-insertion openings 65 are fitted, and into which openings the battery cells 70 are pushed or pressed. In some embodiments, the battery cells 70 have a flat negative terminal, whereby the battery cells 70 with the flat negative terminal are pushed downward into the cell-insertion openings 65 and into the base of housing 61. The flat negative terminal is generally less susceptible to mechanical damages than is the usually dome-shaped and rounded positive terminal. As the battery cells 70 are pushed in with the same alignment, such as with the flat negative terminal facing downward, mechanical insertion of the cells 70 may be done with a constant insertion depth and quality, thereby improving the quality and durability of the later contact between the relevant side of the battery cells 70 and any terminal plate arranged at the bottom. Planar contact with a cooling plate 30 may be established after the insertion procedure by gluing the bottom of the cell block 60 with a conductive adhesive, whereby even and durable heat dissipation over the terminal plate may be achieved.

In some embodiments, one or more cell-insertion openings 65 have one or more ridges, which guide and hold the battery cells 70 as they are pushed and/or pressed in, such that the ridges become elastically or plastically deformed during insertion of the battery cells 70. The ridges mentioned here are situated on the inner lateral surface of the cell-insertion openings 65. The ridges provide defined guidance, allowing for accurate alignment of the battery cells 70 in the housing 61, as well as firm retention of the battery cells 70 Firm and defined alignment of the battery cells 70 upon placement into the base of housing 61 facilitates later placement and insertion of the cell fixation 80 into an accurate position, especially alignment of the bond openings 82 of the cell fixation 80 relative to the corresponding terminals of the already inserted battery cells 70.

In some embodiments, the battery cells 70 on the side inserted through the cell-insertion opening 65 are provided with a conductive adhesive, as indicated above, in order to provide a heat-conducting connection with a cooling plate 30. The conductive adhesive or any so-called gap filler, besides the heat-conducting connection described above, contributes to a stable and low-vibration mounting of the cell blocks 60 on the cooling plate 30.

In some embodiments, the collar 81 and cell fixation 80 are provided as an integral component, e.g., made of plastic, whereby the advantages explained above are achieved by very simple means. Moreover, the cell fixation 80 may be formed as an injection-molding part.

In some embodiments, the cell fixation 80 and the collar 81 may be made of different plastics, i.e., collar 81 is of a softer plastic than is cell fixation 80. This will improve the aforementioned advantages in terms of vibration absorption, alignment, and fixation of the battery cells 70.

In some embodiments, the cell fixation 80 has at least one additional collar 83 around a bond opening 82, which collar is provided on the side facing the battery cells 70. The additional collar(s) 83 are thus in contact with the battery cell(s) 70. This will ensure a clean placement of the cell fixation 80 on the battery cells 70, as with regard to the above-mentioned effects, the vibration absorption and defined alignment of the battery cells 70 are enhanced.

In some embodiments, the housing 61 has an end stop limiting the distance the cell fixation 80 may be inserted. This will improve the defined fixation and alignment of the battery cells 70. Moreover, the ensuing placement of the end plate into a precise position is simplified. For the same reason, the cell fixation 80 and/or the housing 61 may have means for engaging the cell fixation 80 at a certain position in the housing 61.

In accordance with a method for assembling the cell block 60, one or more battery cells 70 are initially inserted into the box-shaped housing 61, which is open on one side. Next, the cell fixation 80 is pushed through the open side into the housing 61, such that the battery cells 70 become fixed in the housing 61 and the housing 61 at least partially closed, whereby the cell fixation 80 has one or more bond openings 82, through which the battery cells 70 may be accessed after insertion of the cell fixation 80, and whereby a projecting collar 81 is provided at least partially around a bond opening 82 on the side facing away from the battery cells 70 of the cell fixation 80, as described above.

In some embodiments, when the battery cells 70 are pushed into the cell-insertion openings 65 of the housing 61, as described above, initially the base side (e.g., the negative side) of the cell block 60 is bonded after insertion of the cell fixation 80. Following this, the cell block 60 is installed on a cooling plate 30, which also serves as a carrier of one or more cell blocks 60. The cell blocks 60 may be fastened to cooling plate 30, e.g., with screws. Subsequently, i.e., after installation of cell block 60 on the cooling plate 30, the side of the battery cells 70 facing away from the cooling plate 30 (e.g., the positive side) is bonded with the corresponding contact plate 105. In this manner, a layer of cell blocks 60 is created, which on one side, e.g., the negative side, is in contact with a cooling plate 30.

Additionally, a further layer may be provided in mirror-image fashion on the opposite side of the cooling plate 30, thus improving space utilization with optimized power output.

More Descriptions of the Terminal-Connection Plate 100

The terminal-connection plate 100 has two conductive contact plates 105, 106, each of which may be brought into contact with one or more battery cells 70. In some embodiments, several battery cells 70 are assembled to form a block and electrically connected in parallel via a contact plate 105 of a terminal-connection plate 100 on one side and a contact plate 106 of another terminal-connection plate 100 on the other. In this case, the terminal-connection plate 100 thus connects two cell blocks 60, each of which are composed of several battery cells 70. In some embodiments, the terminal-connection plate 100 connects two cell blocks 60 in a row. In addition, a contact plate 106 is brought into electrical contact with the negative terminal of a cell block 60 and the other contact plate 105 is brought into electrical contact with the positive terminal of a second cell block 60. In a special case, a cell block 60 has only one single battery cell 70, whereby the terminal-connection plate 100 interconnects only two battery cells 70. When referring to a cell block 60 in the following, this includes the special case of a cell block 60 having only one battery cell 70. Both contact plates 105 and 106 of the terminal-connection plate 100 are conductively interconnected via a connecting bridge 107. On the connecting bridge 107 of the terminal-connection plate 100, a sensor-mounting device 120 is provided for a sensor 150, which is provided for measuring a physical characteristic of the battery, e.g., the temperature, in the vicinity of a cell block 60.

As the terminal-connection plate 100 with a sensor-mounting device 120 is provided for a sensor 150, the functions of establishing electric conduction between the cell blocks 60 and performing battery measurements may be combined synergetically with one another.

In this regard, the overall structure of a battery having several cell blocks 60 is simplified. Moreover, the sensor is situated in direct proximity to the cell blocks 60, whereby the accuracy of the measurements performed with the sensor may be improved.

In some embodiments, the terminal-connection plate 100 connects two adjacent cell blocks 60, whereby the sensor-mounting device 120 for the sensor 150 is provided roughly in the center between the two adjacent cell blocks 60. In this case, one sensor for two cell blocks 60 is sufficient, whereby the number of required sensors may optionally be reduced by half.

In some embodiments, the connecting bridge 107 has one or more impressions, such that the sensor-mounting device 120 may be secured on the connecting bridge 107, whereby especially slipping of the sensor-attachment device 120 along the connecting bridge 107 is prevented in a simple way.

In some embodiments, a sensor is fastened via the sensor-attachment device 120 on the terminal-connection plate 100. As the terminal-connection plate 100 is already equipped with a sensor, battery installation may be simplified.

In some embodiments, the sensor 150 is a temperature sensor. Generally, temperature changes occur in batteries. The life and discharge of the battery may depend on the temperature. For example, with conventional lithium-ion batteries, the probability of battery failure increases with increasing temperature. The cycle lifetime does not depend solely on the type and quality of the battery, or the type of battery usage, etc., but also on the temperature. Some batteries need to be used at room temperature, as low temperatures during operation may likewise be harmful. As a temperature sensor 150 is fastened directly on the connecting bridge 107 via a sensor-attachment device 120, the temperature in the direct vicinity of the battery cells 70 may be measured, thereby improving measuring accuracy.

In some embodiments, the two contact plates 105, 106 of the terminal-connection plate 100 are arranged parallel to one another, whereby they are connected by the connecting bridge 107, such that they are arranged offset from one another on the contact plates 105, 106, in plan view. In this way, adjacent cell blocks 60 are interconnected in a space-saving fashion. Here, the offset of the contact plates 105, 106 may be such that they do not overlap in plan view. If the cell blocks 60 are designed as a cluster of upright cylindrical battery cells 70, diagonal connection of adjacent cell blocks 60 from top to bottom occurs to a certain extent. A sensor, which is arranged roughly at the center of the connecting bridge 107, is thus situated roughly in the center between two adjacent cell blocks 60, whereby a sensor is responsible for two cell blocks 60.

In some embodiments, at least one of the two contact plates 105, 106 have at least one opening 102, through which, access to the battery cells 70 in the installed or pre-installed condition is possible. Access to the battery cell(s) 70 after installation of the terminal-connection plate 100 is useful in particular, when the electrical connection between the terminal-connection plate 100 and the corresponding terminal of the battery cell 70 is done via a so-called bond. Bonding may be done, e.g., by means of thin wires (wire bonds), soldering, or in some other way. Subsequent restoral of defective electrical connections between the contact plate 105, 106 and battery cell 70 may also be accomplished in a simple way due to the openings 102, without deinstallation of the terminal-connecting plate 100. Bonding in the pre-installed condition enhances safety during installation against any short-circuits, etc. Moreover, the openings 102 serve as degassing openings 102 in the case of a defective battery cell 70. When certain batteries are overloaded, compensation reactions may occur, resulting in, e.g., the decomposition of water and the formation of detonating gas. One or more openings for the degassing of defective battery cells therefore enhance battery safety. Furthermore, if the contact plate 105, 106 is in direct (mechanical and electrical) connection with a terminal of a battery cell 70, then one or more openings 102 may improve even contacting, especially if the corresponding terminal of the battery cell 70 has a rounded surface, e.g., gently dome-shaped, which a positive terminal usually does. In this case, a collar-like projection may be provided around the opening 102 of the contact plate 105, 106 in order to enable even placement of the contact plate 105, 106 on the terminal.

If the contact plate 105, 106 for cell blocks 60 is provided with several battery cells 70, then the contact plate 105, 106 may have several openings 102 of the type described above.

In order to simplify the installation of the contact plate 105, 106 on a battery block, one or more edges of the rectangular contact plate 105, 106 may be beveled or notched. Via the bevels or notches, the contact plate 105, 106 may be fastened with screws or inserted, e.g., using retention structures for the cell block 60. Obviously, openings in the contact plate 105, 106 may also be provided for this purpose. The contact plate 105, 106 may alternatively or additionally have notches, lugs, projections and/or other structures, which serve as attachment devices for the contact plate 105, 106 in the battery, or as attachment devices for other components on the terminal-connection plate 100.

In some embodiments, both contact plates 105, 106 and the connecting bridge 107 of the terminal-connection plate 100 are formed as integral components. The terminal-connection plate 100 may be made by punching out a basic form from a sheet metal, and subsequently bending the contact plate 105, 106.

In some embodiments, the sensor-attachment device 120 described above is a clip. The clip is made of a material, which has a certain elasticity, so that it may be clipped to the connecting bridge 107 of the terminal-connection plate 100.

In some embodiments, the clip 120 is a U-shaped part, whose upper open ends 121 are both provided with a hook-shaped projection 122. The sensor 150 may be introduced completely or partially into the U-shaped cutout of the clip 120, whereupon the whole clip-and-sensor assembly is slid over the connecting bridge 107, such that the projections of the clip on the side of the connecting bridge 107 facing away from the sensor engage with the connecting bridge 107. The sensor 150 thus becomes securely fastened on the terminal-connection plate 100. Moreover, interaction with any impressions on the connecting bridge 107 effectively prevents slipping of the sensor along the connecting bridge 107.

In some embodiments, the sensor-mounting device 120 consists of plastic, whereby the required strength of the connection is achieved by adding only a small amount of weight, which is especially desirable in electric-vehicle applications. The weight of the vehicle, including the battery, is a crucial parameter, which determines power consumption and thus the range of the vehicle.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A battery housing for receiving a battery cooled by a liquid coolant, the battery housing comprising:
    a battery plate configured to cool the battery, the battery plate having a first end, a second end, a top surface, and a bottom surface, the battery plate comprising first and second cooling tubes fitted in the battery plate, wherein the first cooling tube enables flow of the coolant liquid in a first direction, and the second cooling tube enables flow of the coolant liquid in a second direction opposite the first direction;
    first, second, third, and fourth side panels, wherein:
        the first and the second side panels are opposite to each other;
        the first side panel has a first elongated recess configured to receive the first end of the battery plate; and
        the second side panel has a second elongated recess configured to receive the second end of the battery plate; and
    first and second cover plates;
    wherein:
        the first end of the battery plate is inserted in the first elongated recess;
        the second end of the battery plate is inserted in the second elongated recess;
        the side panels are configured to connect together to form at least a four-sided housing and to hold the battery plate without the cover plates;
        at least one of the top and bottom surfaces of the battery plate is configured to hold the battery; and
        the first and second cover plates are connected respectively to a top and bottom of the at least four-sided housing, the connected cover plates being parallel to the top surface of the battery plate.

2. The battery housing according to claim 1, wherein the battery plate comprises a first cooling circuit including the first cooling tube and a second cooling circuit including the second cooling tube, wherein the first and second cooling circuits are independent cooling circuits operating according to a countercurrent principle.

3. The battery housing according to claim 1, wherein the first and second cooling tubes are fitted in the battery plate, wherein the cooling tubes extend substantially parallel to one another.

4. The battery housing according to claim 3, wherein the battery plate comprises:
    a baseplate, one or more recesses being fitted in the baseplate for receiving the cooling tubes; and
    a cover connected to the baseplate.

5. The battery housing according to claim 4, wherein the baseplate and the cover are screwed together.

6. The battery housing according to claim 1, wherein the side panels are screwed together.

7. The battery housing according to claim 1, further comprising:
    one or more gas discharge openings.

8. The battery housing according to claim 1, further comprising:
    a module control unit attached on an outside of the battery housing, the module control unit being configured to control the battery.

9. The battery housing according to claim 1, wherein at least one of the top and bottom surfaces of the battery plate is equipped with one or more cell blocks including one or more battery cells.

10. The battery housing according to claim 9, wherein the top and bottom surfaces of the battery plate are each equipped with the cell blocks.

11. The battery housing according to claim 10, further comprising:
    a plurality of terminal-connection plates configured to connect adjacent battery cells, the terminal-connection plates comprising contact plates, wherein the contact plates are mounted on positive and negative sides of the battery cells.

12. The battery housing according to claim 1, wherein:
    the first elongated recess is positioned between a top lateral edge of the first side panel and a bottom lateral edge of the first side panel; and
    the second elongated recess is positioned between a top lateral edge of the second side panel and a bottom lateral edge of the second side panel.

13. The battery housing according to claim 12, wherein the top and bottom surfaces of the battery plate are each equipped with a cell block including a battery cell.

14. The battery housing according to claim 1, wherein:
    the first elongated recess is positioned in a substantially central position between a top lateral edge of the first side panel and a bottom lateral edge of the first side panel; and
    the second elongated recess is positioned in a substantially central position between a top lateral edge of the second side panel and a bottom lateral edge of the second side panel.

15. A method for installing a battery in a battery housing, comprising:
    providing the battery housing according to claim 1;
    inserting the first end of the battery plate into the first elongated recess of the first side panel;
    inserting the second end of the battery plate into the second elongated recess of the second side panel;
    assembling the battery in the battery housing, such that the battery is held by the side panels;
    mounting at least one of the cover plates to the top or bottom of the battery housing.

16. The method according to claim 15, wherein assembling the battery comprises assembling the battery in the battery housing with at least one of the cover plates opened.

17. The method according to claim 15, further comprising:
    equipping at least one of the top and bottom surfaces of the battery plate with one or more cell blocks including a plurality of battery cells.

18. The method according to claim 17, wherein equipping the battery plate with the one or more cell blocks includes:

equipping the one or more cell blocks with the battery cells;
mounting contact plates of terminal-connection plates on positive and negative sides of the battery cells;
bonding the negative side of the battery cells with an appropriate contact plate;
mounting the cell blocks on the battery plate with the negative side mounted on the battery plate; and
bonding the positive side of the battery cells with a corresponding contact plate.

* * * * *